United States Patent
Chen et al.

(10) Patent No.: US 9,525,608 B2
(45) Date of Patent: Dec. 20, 2016

(54) OUT-OF BAND NETWORK PORT STATUS DETECTION

(71) Applicant: Quanta Computer Inc., Guishan Dist., Taoyuan (TW)

(72) Inventors: Shou-Chih Chen, Taoyuan (TW); Yung-Fu Li, Taoyuan (TW); Chin-Fu Tsai, Taoyuan (TW)

(73) Assignee: QUANTA COMPUTER, INC., Taoyuan (TW)

( * ) Notice: Subject to any disclaimer, the term of this patent is extended or adjusted under 35 U.S.C. 154(b) by 0 days.

(21) Appl. No.: 14/630,675

(22) Filed: Feb. 25, 2015

(65) Prior Publication Data
US 2016/0248648 A1    Aug. 25, 2016

(51) Int. Cl.
*G06F 15/173* (2006.01)
*H04L 12/26* (2006.01)
*H04L 29/08* (2006.01)
*G06F 12/00* (2006.01)

(52) U.S. Cl.
CPC ..... *H04L 43/0811* (2013.01); *H04L 29/08072* (2013.01); *H04L 43/06* (2013.01)

(58) Field of Classification Search
USPC ................ 709/203, 217–219, 223–229, 250
See application file for complete search history.

(56) References Cited

U.S. PATENT DOCUMENTS

| | | | |
|---|---|---|---|
| 6,898,368 B2 | 5/2005 | Colombo et al. | |
| 7,343,441 B1 | 3/2008 | Chrysanthakopoulos et al. | |
| 7,417,953 B2 | 8/2008 | Hicks et al. | |
| 7,517,243 B2 | 4/2009 | Caveney et al. | |
| 7,706,359 B2 | 4/2010 | Pounds et al. | |
| 7,809,869 B2 | 10/2010 | Atherton et al. | |
| 8,407,427 B2 | 3/2013 | Ruberg et al. | |
| 8,458,390 B2 | 6/2013 | Mehrotra et al. | |
| 8,468,239 B2 * | 6/2013 | Raghavendran et al. | .... 709/224 |
| 8,638,651 B2 | 1/2014 | Michaelis et al. | |
| 8,832,503 B2 | 9/2014 | Anne et al. | |
| 8,842,687 B1 | 9/2014 | Jackson et al. | |
| 2003/0212784 A1 * | 11/2003 | Nguyen | ........................ 709/224 |
| 2005/0206528 A1 | 9/2005 | Hsieh | |

(Continued)

FOREIGN PATENT DOCUMENTS

| | | |
|---|---|---|
| JP | 201110152 A | 1/2011 |
| JP | 201238257 A | 2/2012 |

OTHER PUBLICATIONS

Sherwood et al., "FlowVisor: A Network Virtualization Layer", Retrieved fromL http://sb.tmit.bme.hu/mediawiki/images/c/c0/FlowVisor.pdf (Oct. 14, 2009). (15 pages).

(Continued)

*Primary Examiner* — Zarni Maung
(74) *Attorney, Agent, or Firm* — Nixon Peabody LLP; Eduardo J. Quinones

(57) ABSTRACT

A device for out-of-band network port status detection includes a management controller (MC), a network interface controller (NIC) with a PHY and a link indicator, an electrical connection coupling the link indicator to an input pin of the MC, and at least one processor. The MC monitors a status of the link indicator and the at least one processor is configured for reporting the status of the link indicator to a user of the apparatus.

20 Claims, 5 Drawing Sheets

(56) References Cited

U.S. PATENT DOCUMENTS

| | | | |
|---|---|---|---|
| 2007/0005304 A1* | 1/2007 | Celestini | 702/188 |
| 2007/0110077 A1* | 5/2007 | Takashige et al. | 370/395.53 |
| 2008/0056120 A1* | 3/2008 | Jha et al. | 370/216 |
| 2008/0140687 A1* | 6/2008 | Oh et al. | 707/100 |
| 2008/0285552 A1* | 11/2008 | Abdulla et al. | 370/389 |
| 2009/0238083 A1 | 9/2009 | Yoshida | |
| 2011/0238818 A1* | 9/2011 | Wang | H04L 41/0853 709/224 |
| 2014/0032173 A1* | 1/2014 | Kida et al. | 702/183 |
| 2014/0169189 A1 | 6/2014 | Kalkunte | |
| 2014/0215489 A1* | 7/2014 | Bhatia | G06F 9/546 719/313 |
| 2014/0218199 A1 | 8/2014 | Cepulis et al. | |
| 2014/0289570 A1* | 9/2014 | Lewis | G06F 11/3089 714/43 |
| 2015/0012648 A1 | 1/2015 | Testin | |
| 2015/0154028 A1* | 6/2015 | Chen | G06F 9/4401 713/2 |
| 2015/0172112 A1* | 6/2015 | Itkin | H04L 45/245 370/216 |

OTHER PUBLICATIONS

Extended European Search Report mailed Feb. 18, 2016 for counterpart European application No. 15181606.3.
Taiwanese Office Action 2015-178690 mailed Nov. 1, 2016 w/ English Summary.

* cited by examiner

100

110

MONITORING A STATUS OF A LINK INDICATOR OF A NETWORK INTERFACE CONTROLLER (NIC) BY THE MC, WHEREIN THE LINK INDICATOR IS CONNECTED TO AN INPUT PIN OF THE MC

120

REPORTING THE STATUS OF THE LINK INDICATOR TO A USER OF THE COMPUTER SYSTEM

130

ADDING A SENSOR DATA RECORD (SDR) OF A LAN TYPE FOR THE STATUS OF THE LINK INDICATOR TO A FIRMWARE OF THE MC

140

SETTING A SCANNING BIT IN THE SDR TO CAUSE A LINK STATUS SENSOR OF THE MC TO MONITOR THE STATUS OF THE LINK INDICATOR

FIG. 1

OUT-OF BAND NETWORK PORT STATUS DETECTION

BACKGROUND

1. Field

This application relates to system status detection, and more particularly to a system and method for out-of-band network port status detection.

2. Background

A network administrator can be responsible for managing a large number of computer servers in a data center. The network administrator monitors the functional status of each computer server's network port (e.g., for a local area network (LAN)). Each network port (e.g., an 8 position 8 contact (8P8C) port) typically receives a cable with a connector end (e.g., a Registered Jack 45 (RJ45) connector cable).

If a cable becomes faulty or physically disconnected from the network port, the computer server will lose network connection, which may affect an end user. The network administrator will typically perform a self-test procedure to remotely confirm a problem before physically going to the computer server to check the cable connections.

SUMMARY

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

In accordance with one or more aspects of the examples described herein, systems and methods are provided for out-of-band network port status detection.

In an implementation, a method is provided for out-of-band network port status detection by a management controller (MC) of a computer system. The method includes monitoring a status of a link indicator of a network interface controller (NIC) by the MC, where the link indicator is connected to an input pin of the MC. The method further includes reporting the status of the link indicator to a user of the computer system.

In a related aspect, the method further includes adding a sensor data record (SDR) of a LAN type for the status of the link indicator to a firmware of the MC. In another related aspect, the method further includes setting a scanning bit in the SDR to cause a link status sensor of the MC to monitor the status of the link indicator.

In another implementation, an apparatus is provided for out-of-band network port status detection. The apparatus includes a MC, a NIC including a link indicator, and an electrical connection coupling the link indicator to an input of the MC, where the MC monitors a status of the link indicator. The apparatus further includes at least one processor configured for reporting the status of the link indicator to a user of the apparatus.

In yet another implementation, a non-transitory computer-readable medium is provided for out-of-band network port status detection. The non-transitory computer-readable medium stores executable instructions which cause a data processing device to monitor a status of a link indicator of a NIC, where the link indicator is connected to an input pin of a MC. The data processing device is further caused to report the status of the link indicator to a user of the data processing device.

BRIEF DESCRIPTION OF THE DRAWINGS

FIG. 1 illustrates an example methodology for out-of-band network port status detection;

DETAILED DESCRIPTION

Figure 2:
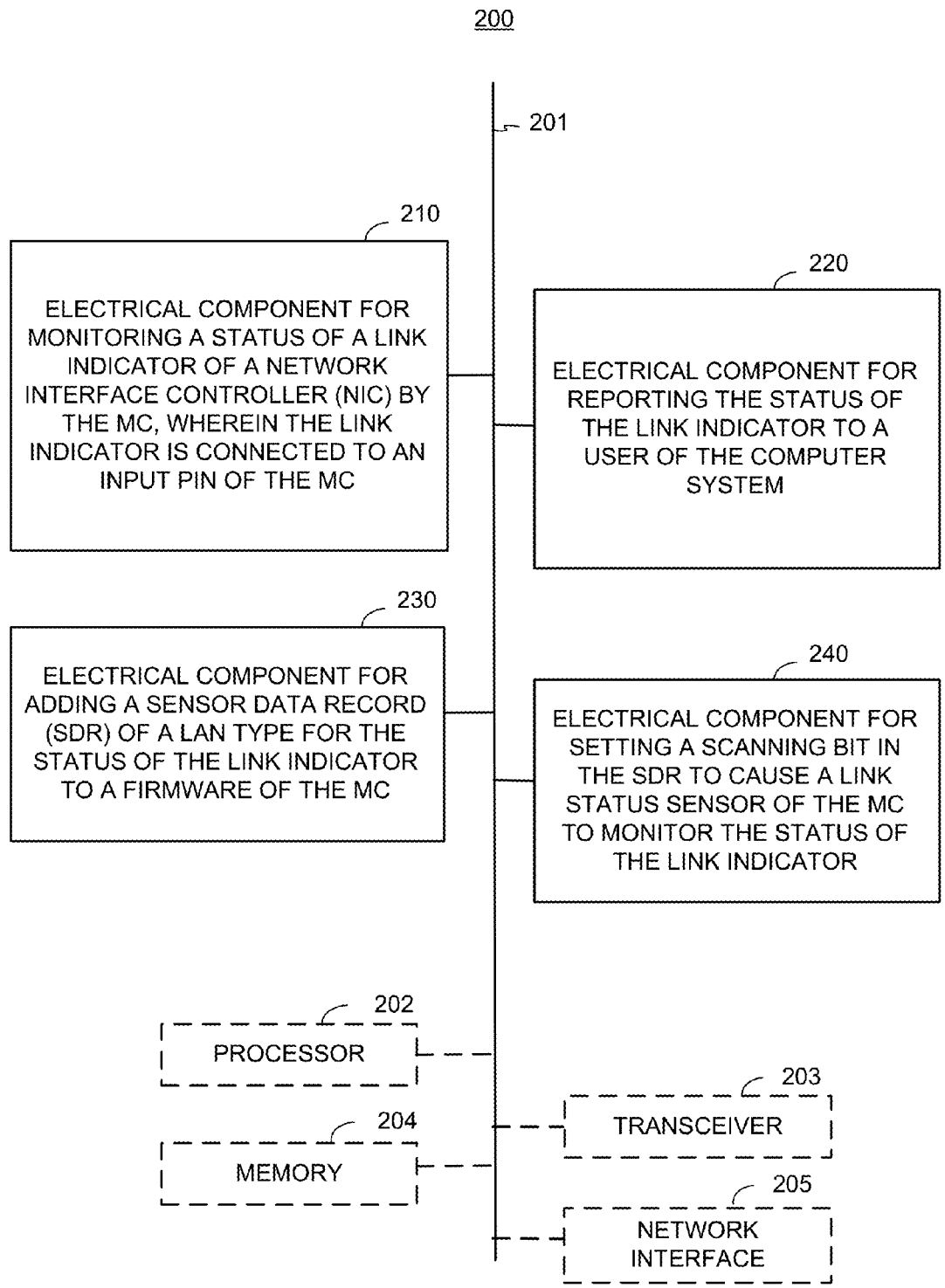
FIG. 2 illustrates an example apparatus for out-of-band network port status detection in accordance with the methodology of FIG. 1.

A number of techniques have been developed to remotely manage the operation of computer servers in a manner that provides accessibility, consistency, and efficiency. Remote management allows the removal of input/output interfaces (e.g., monitors, keyboards, and mice) for the servers, as well as the need for the network administrator to physically visit each computer server. For example, large data centers containing numerous computer servers are commonly managed using a variety of remote management tools to configure, monitor, and troubleshoot server hardware and software.

In accordance with certain aspects of the subject technology, a computer system (e.g., a computer server) can include a MC. The computer system can include a NIC with a link indicator. The link indicator can be electrically coupled to an input pin of the MC, where the MC can monitor a status of the link indicator. For example, link light LEDs for the link indicator can be directly coupled to an input pin of the MC. This additional electrical coupling, in contrast to a computer system without this additional electrical coupling, allows the MC to directly detect the status of the link indicator via the link light LEDs to monitor whether a cable (e.g., a RJ45 cable) becomes detached or faulty. This allows the MC to directly access the status of the network ports. These direct electrical connections between the link light LEDs and the MC may greatly improve the timely detection of cable detaches or failures.

The computer system can include at least one processor configured for reporting the status of the link indicator to a user of the apparatus. In a related aspect, an attribute of the input pin of the MC can be configured as a general-purpose input (GPI) in a firmware of the MC. In another related implementation, a sensor data record (SDR) of a LAN type for the status of the link indicator can be added to a firmware of the MC. In yet another related aspect, a scanning bit in the SDR can be set to cause a link status sensor of the MC to monitor the status of the link indicator.

Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

In accordance with one or more aspects of the implementations described herein, with reference to FIG. 1, a methodology 100 is shown for out-of-band network port status detection. The method 100 can involve, at step 110, monitoring a status of a link indicator of a network interface controller (NIC) by a management controller (MC) of a computer system, wherein the link indicator is connected to an input pin of the MC.

The NIC is a hardware component allows a data processing device to communicate with a network. The NIC can be a dedicated NIC and/or a motherboard integrated NIC. The NIC can also be known as a network interface card, a network adapter, a LAN adapter, or other similar terms. The NIC can have one or more light emitting diodes (LEDs) (i.e., the link indicator) that indicate certain conditions regarding a network connection with the NIC. A link light LED can indicate whether a network connection exists between the NIC and the network.

The MC can be a specialized microcontroller, such as a baseboard management controller (BMC). The MC can be embedded on a motherboard of the data processing system. The MC can manage the interface between system management software and platform hardware. Different types of sensors built into the data processing device can report to the MC on parameters such as temperature, cooling fan speeds, power status, operating system (OS) status, etc. The MC can monitor the sensors and have the ability to send alerts to a network administrator via the network interface if any of the parameters does not stay within preset limits, indicating a potential failure of the system.

The method 100 can involve, at step 120, reporting the status of the link indicator to a user of the computer system. In a related aspect, the computer system 400 can include a web-based user interface (Web UI) and/or a management system (MS) software for use by a user such as a network administrator. The Web-UI and/or MS can communicate with the MC via a system interface (SI) and/or LAN to learn whether any cables is detached or faulty. The Web UI and/or MS software can conveniently allow the network administrator to obtain access to the MC via a network such as the Internet or a LAN to monitor the link indicator.

The method 100 can optionally involve, at step 130, adding a sensor data record (SDR) of a LAN type for the status of the link indicator to a firmware of the MC. SDRs are records that contain information about the type and number of sensors, where a SDR describes a specific sensor. The SDRs can be stored in a central, non-volatile storage (i.e., the SDR Repository) managed by the MC.

The method 100 can optionally involve, at step 140, setting a scanning bit in the SDR to cause a link status sensor of the MC to monitor the status of the link indicator.

In accordance with one or more aspects of the implementations described herein, FIG. 2 illustrates an exemplary apparatus for out-of-band network port status detection in accordance with the methodology of FIG. 1. The exemplary apparatus 200 can be configured as a computing device or as a processor or similar device/component for use within. In one example, the apparatus 200 can include functional blocks that can represent functions implemented by a processor, software, or combination thereof (e.g., firmware). In another example, the apparatus 200 can be a system on a chip (SoC) or similar integrated circuit (IC).

In one implementation, the apparatus 200 can include an electrical component or module 210 for monitoring a status of a link indicator of a network interface controller (NIC) by a management controller (MC) of a computer system, wherein the link indicator is connected to an input pin of the MC.

The apparatus 200 can include an electrical component 220 for reporting the status of the link indicator to a user of the computer system.

The apparatus 200 can optionally include an electrical component 230 for adding a sensor data record (SDR) of a LAN type for the status of the link indicator to a firmware of the MC.

The apparatus 200 can optionally include an electrical component 240 for setting a scanning bit in the SDR to cause a link status sensor of the MC to monitor the status of the link indicator.

In further related aspects, the apparatus 200 can optionally include a processor component 202. The processor 202 can be in operative communication with the components 210-240 via a bus 201 or similar communication coupling. The processor 202 can effect initiation and scheduling of the processes or functions performed by electrical components 210-240.

In yet further related aspects, the apparatus 200 can include a radio transceiver component 203. A standalone receiver and/or standalone transmitter can be used in lieu of or in conjunction with the transceiver 203. The apparatus 200 can also include a network interface 205 for connecting to one or more other communication devices or the like. The apparatus 200 can optionally include a component for storing information, such as, for example, a memory component 204. The computer readable medium or the memory component 204 can be operatively coupled to the other components of the apparatus 200 via the bus 201 or the like. The memory component 204 can be adopted to store computer readable instructions and data for affecting the processes and behavior of the components 210-240, and subcomponents thereof, or the processor 202, or the methods disclosed herein. The memory component 204 can retain instructions for executing functions associated with the components 210-240. While shown as being external to the memory 204, it is to be understood that the components 210-240 can exist within the memory 204. It is further noted that the components in FIG. 2 can include processors, electronic devices, hardware devices, electronic subcomponents, logical circuits, memories, software codes, firmware codes, etc., or any combination thereof.

Persons skilled in the art will appreciate that the functionalities of each component of the apparatus 200 can be implemented in any suitable component of the system or combined in any suitable manner.

Figure 3:
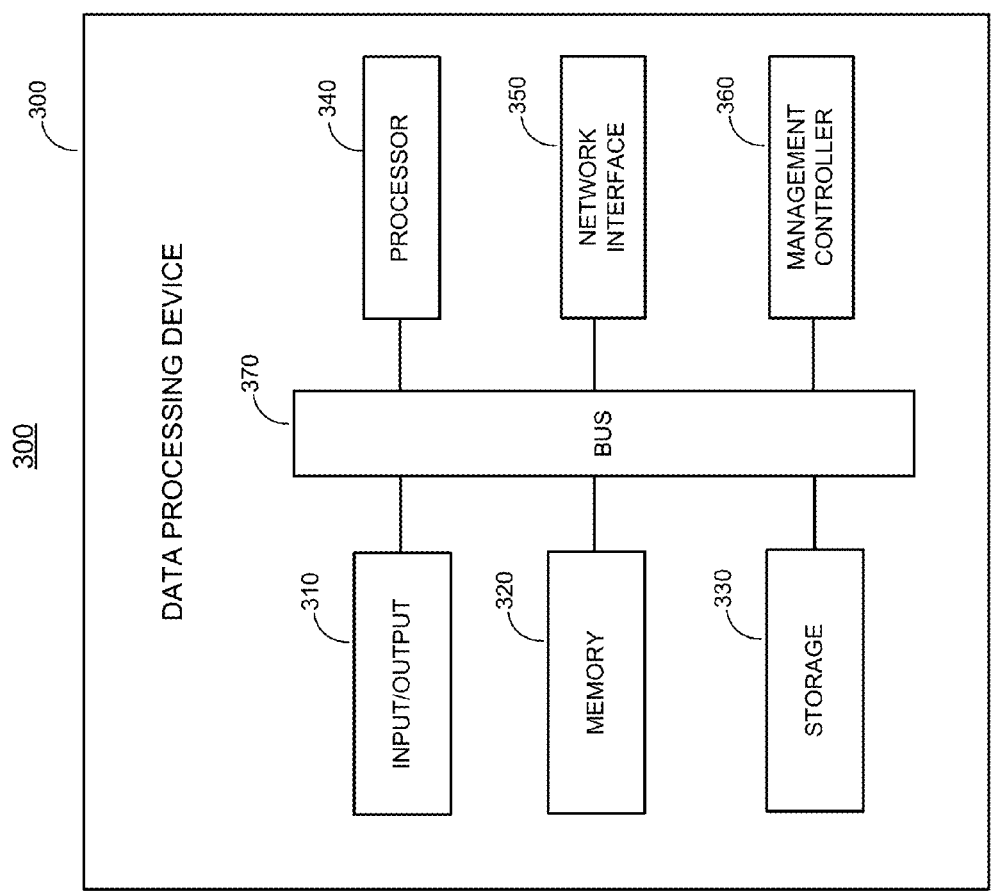
FIG. 3 illustrates an example configuration of components of a data processing device, according to certain aspects of the subject technology.

FIG. 3 illustrates an example configuration of components of a data processing device (e.g., a computer server in a data center), according to certain aspects of the subject technology. As would be apparent to one of ordinary skill in the art, the data processing device 300 can include a processor 340, a network interface 350, a MC 360, a memory 320, a non-transitory computer-readable storage 330, an input/output component 310, and a bus 370.

The data processing device 300 can be, for example, a computer system such as a server (e.g., one of many rack servers in a data center) or a personal computer. The processor (e.g., central processing unit) 340 can retrieve and execute programming instructions stored in the memory 320 (e.g., random-access memory). The programming instructions can cause the data processing device 300 to execute the methodology 100 for out-of-band network port status detection, as shown in FIG. 1. The processor 340 can be a single CPU with a single processing core, a single CPU with multiple processing cores, or multiple CPUs. The bus 370 can transmit instructions and application data between device components such as the processor 340, the input/output component 310, the MC 360, the memory 320, the non-transitory computer-readable storage 330, and the networking interface 350.

The network interface 350 can include a Wi-Fi, Bluetooth®, radio frequency, near-field communication, wired, and/or wireless communication system. The though the network interface 350, the data processing device 300 in certain aspects can communicate with a network, such as the Internet, and can be able to communicate with other such devices.

The network interface can include a NIC, which is a hardware component allows the data processing device 300 to communicate with a network. The NIC can be a dedicated NIC and/or a motherboard integrated NIC. The NIC can also be known as a network interface card, a network adapter, a LAN adapter, or other similar terms.

The NIC can have a network port, such as an 8P8C socket, a Baynonet Neill-Concelman (BNC) connector, and/or an Attachment Unit Interface (AUI), where a network cable is connected. 8P8C connectors (e.g., RJ45 connectors) are modular connectors commonly used to terminate twisted pair and multi-conductor flat cables. The 8P8C connectors are commonly used for Ethernet over twisted pair, registered jacks and other telephone applications. An 8P8C modular connector has two paired components: a male jack and a female socket, each with eight equally-spaced conducting channels. When an 8P8C jack is mated with an 8P8C socket, the contacts meet and create an electrical connection. Spring tension in the socket contacts allows for slight travel when connecting to the jack. The jack includes conductors that are flat contacts positioned parallel with a jack body. The socket includes contacts that are suspended diagonally toward an insertion interface.

The NIC can have one or more light emitting diodes (LEDs) that indicate certain conditions regarding a network connection with the NIC. A link light LED can indicate whether a network connection exists between the NIC and the network. For example, if the link light LED is off, that can indicate a failure in the network connection (e.g., cable is faulty or unplugged). An activity light can indicate whether there is network activity. For example, constant flickering of the activity light can indicate a very busy network. A speed light LED can indicate that the NIC is connected to the network at a certain speed (e.g., 100 Mbps).

The MC 360 can be and/or include a specialized microcontroller, such as a baseboard management controller (BMC). The MC 360 can be embedded on a motherboard of the data processing system. The MC 360 can manage the interface between system management software and platform hardware. Different types of sensors built into the data processing device can report to the MC 360 on parameters such as temperature, cooling fan speeds, power status, operating system (OS) status, etc. The MC 360 can monitor the sensors and have the ability to send alerts to a network administrator via the network interface 350 if any of the parameters do not stay within preset limits, indicating a potential failure of the system.

The MC 360 can additionally be used for out-of-band management of the data processing device 300. For example, the network administrator can also remotely communicate with the MC 360 to take some corrective action such as resetting or power cycling the system to restore functionality.

The non-transitory computer-readable storage 330 can include any form of non-volatile form of data storage such as a hard disk drive (HDD) or a flash drive. The input/output component 310 can receive input from a user. This input/output component 310 can include, for example, a push button, touch pad, touch screen, wheel, joystick, keyboard, mouse, keypad, or any other such device or element whereby a user can input a command to the device. In a related aspect, such a device might not include any buttons at all, and might be controlled through a combination of visual and audio commands, such that a user can control the device without having to be in physical contact with the device.

Figure 4:
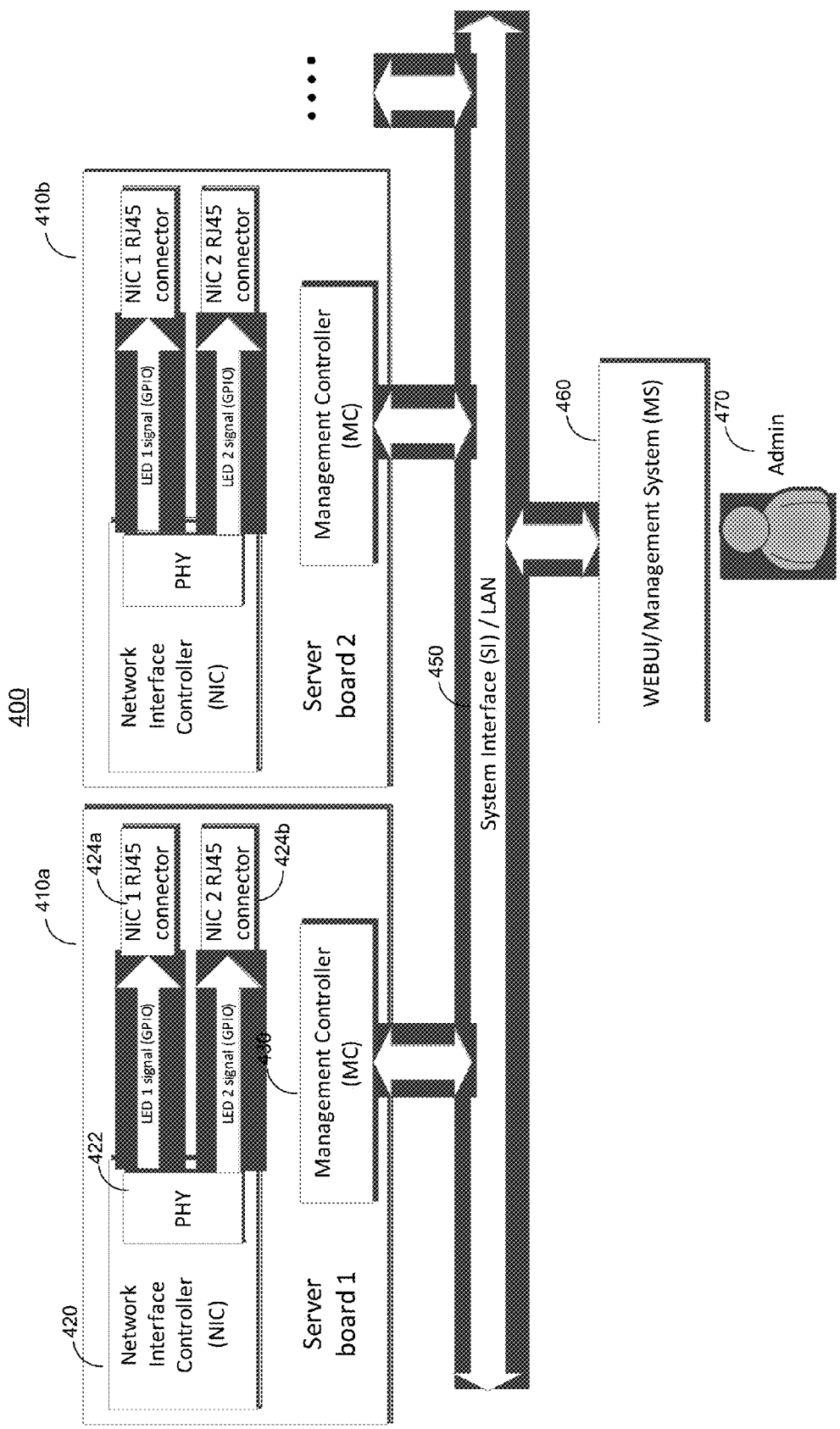
FIG. 4 illustrates an example computer system for network port status detection.

FIG. 4 illustrates an example of a computer system 400 for network port status detection. In the example illustrated, the computer system 400 can include one or more server boards (410*a*, 410*b*). The server board 410*a* can include a NIC 420 and a management controller (e.g., a BMC) 430. The NIC 420 can include a PHY 422 representing circuitry required to implement functions of the physical layer of the Open Systems Interconnection (OSI) model. For example, the PHY can be a PHY chip (e.g., PHYceiver) on the NIC. The PHY chip can provide analog signal physical access to the NIC.

The PHY 422 of the NIC 420 can be electrically coupled to one or more NIC ports (e.g., RJ45) (424*a*, 424*b*), which can in turn receive network cables (e.g., RJ45). In particular, the PHY 422 can couple to the link light LEDs of the RJ45 ports (424*a*, 424*b*) to cause the link light LEDs to turn on if a RJ45 cable is connected or turn off if the RJ45 cable becomes detached or faulty.

The computer system 400 can include a web-based user interface (Web UI) and/or a management system (MS) software 460 for use by a user such as a network administrator 470. The MS 460 can communicate with the MC 430 via a system interface (SI) and/or LAN 450 to learn whether any of the RJ45 cables are detached or faulty. The Web UI can be application software that can run in a web browser of a device (e.g., a computer system, tablet, or mobile device). In a related aspect, the Web UI and/or MS software 460 can conveniently provide the network administrator 470 access to the MC 430 via a network such as the Internet or a LAN.

Figure 5:
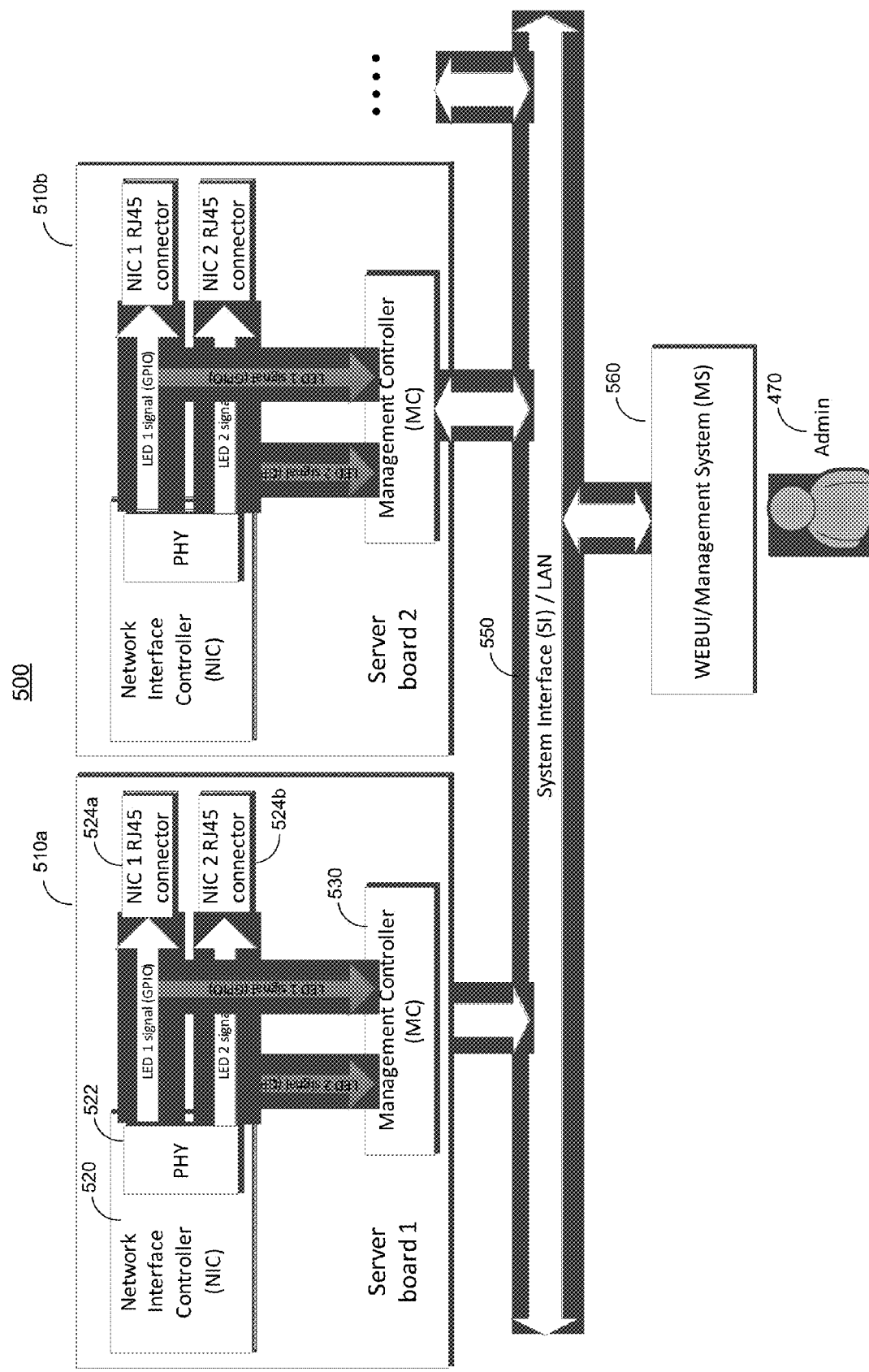
FIG. 5 illustrates an example computer system for out-of-band network port status detection, according to certain aspects of the subject technology.

FIG. 5 illustrates another example of a computer system 500 for out-of-band network port status detection, according to certain aspects of the subject technology. Out-of-band management refers to use of a dedicated channel for monitoring and managing devices connected to a network. Out-of-band management allows a network administrator to monitor and manage servers or other network connected devices by remote control regardless of whether the devices are powered on, or whether operating systems are installed or functional on the devices.

By contrast, in-band management like Virtual Network Computing (VNC) or Secure Shell (SSH) is based on in-band connectivity for which software must be installed on the remote network connected devices being managed. Therefore, in-band management may only be useful after the operating system has been booted. In networking, in-band management may not allow management of remote network connected devices independently of a current status of other network devices.

Intelligent Platform Management Interface (IPMI) defines a standardized set of interfaces used by network administrators for out-of-band management of computer systems and monitoring of their operation. IPMI provides specifications for an autonomous computer subsystem that monitors and manages independently of a computer system's processor and operating system. IPMI provides a way to manage a computer that may be powered off or otherwise unresponsive by using a network connection to the hardware rather than to an operating system.

A network administrator can use IPMI messaging to monitor device status (e.g., temperatures, voltages, fans, power supplies, and/or chassis intrusion), to list hardware inventory information, to review hardware logs (e.g., out-of-range states), or to perform recovery procedures (e.g., restarting a computer system).

In the example illustrated, the computer system 500 can include one or more server boards (510a, 510b). The server board 510a can include a NIC 520 and a MC 530. The NIC 520 can include a PHY 522.

The PHY 522 of the NIC 520 can be electrically coupled to one or more NIC ports (e.g., RJ45) (524a, 524b), which can in turn receive network cables (e.g., RJ45). In particular, the PHY 22 can couple to the link light LEDs of the RJ45 ports (524a, 524b) to cause the link light LEDs to turn on if a RJ45 cable is connected or turn off if the RJ45 cable becomes detached or faulty. In a related aspect, the link light LEDs for link indicators of the NIC 520 can be connected to input pins of the MC 530, allowing the MC 530 to monitor whether a RJ45 cable becomes detached or faulty.

A General-purpose input (GPI) can refer to a generic pin on an integrated circuit with no predefined purpose and are unused by default. In a related aspect, an input pin of the MC 530 can be configured as a GPI.

The IPMI standard specification defines Sensor Data Record (SDR) as records that contain information about the type and number of sensors, where a SDR describes a specific sensor. The SDRs can be stored in a central, non-volatile storage (i.e., the SDR Repository) managed by the MC. In a related aspect, a sensor data record (SDR) of a LAN type for the status of the link indicator can be added to a firmware of the MC. In a related aspect, a scanning bit in the SDR can be set to cause a link status sensor of the MC to monitor the status of the link light LEDs of the network ports.

The computer system 500 can include a web-based user interface (Web UI) and/or a management system (MS) software 560 for use by a user such as a network administrator 570. The MS 560 can communicate with the MC 530 via a system interface (SI) and/or LAN 550 to learn whether any of the RJ45 cables are detached or faulty. The Web UI can be an application software that can run in a web browser of a device (e.g., a computer system, tablet, or mobile device). In a related aspect, the Web UI and/or MS software 560 can conveniently allow the network administrator 570 access to the MC 530 via a network such as the Internet or a LAN.

The various implementations can be implemented in a wide variety of operating environments, which in some cases can include one or more user computers, data processing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as can be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most implementations utilize at least one network that would be familiar to those skilled in the art for supporting communications using any of a variety of commercially-available protocols, such as TCP/IP, OSI, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In implementations utilizing a Web server, the Web server can run any of a variety of server or mid-tier applications, including HTTP servers, FTP servers, CGI servers, data servers, Java servers, and business map servers. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, or TCL, as well as combinations thereof. The server(s) can also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of implementations, the information can reside in a storage-area network ("SAN") familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system can also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate implementations can have numerous variations from that described above. For example, customized hardware might also be used and/or particular elements might be implemented in hardware, software (including portable software, such as applets), or both. Further, connection to other data processing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various implementations.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

The description of the subject technology is provided to enable any person skilled in the art to practice the various implementations described herein. While the subject technology has been particularly described with reference to the various figures and implementations, it should be understood that these are for illustration purposes only and should not be taken as limiting the scope of the subject technology.

There can be many other ways to implement the subject technology. Various functions and elements described herein can be partitioned differently from those shown without departing from the scope of the subject technology. Various modifications to these implementations will be readily apparent to those skilled in the art, and generic principles defined herein can be applied to other implementations. Thus, many changes and modifications can be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various implementations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

The invention claimed is:

1. A method for out-of-band network port status detection by a baseboard management controller (BMC) device of a computer system, the method comprising:
    monitoring input signals at an input pin of the BMC device directly coupled to a link indicator of a network interface controller (NIC);
    determining a connection status of the NIC based on the input signals and a sensor data record (SDR) for the link indicator; and
    reporting the connection status of the NIC, over a network, to a management system.

2. The method of claim 1, wherein an attribute of the input pin of the BMC device is configured as a general-purpose input (GPI).

3. The method of claim 1, wherein the SDR is a local area network (LAN) type for the status of the link indicator.

4. The method of claim 3, further comprising setting a scanning bit in the SDR to cause a link status sensor of the BMC device to monitor the status of the link indicator.

5. The method of claim 1, wherein reporting the status of the link indicator is via a management system software.

6. The method of claim 1, wherein reporting the status of the link indicator is via a management controller web-based user interface (Web UI).

7. The method of claim 1, wherein the link indicator is a link light-emitting-diode (LED) on the NIC.

8. An apparatus configured for out-of-band network port status detection, the apparatus comprising:
    a baseboard management controller (BMC) device;
    a network interface controller (NIC) with a PHY and a link indicator;
    an electrical connection directly coupling the link indicator to an input pin of the BMC device, wherein the BMC device monitors input signals at the input pin for a status of the link indicator, and determines a connection status of the NIC based on the input signals and a sensor data record (SDR) for the link indicator; and
    at least one processor configured for reporting the status of the link indicator, over a network, to a management system.

9. The apparatus of claim 8, wherein an attribute of pin of the BMC device is configured as a general-purpose input (GPI).

10. The apparatus of claim 8, wherein the SDR is a local area network (LAN) type for the status of the link indicator.

11. The apparatus of claim 10, wherein a scanning bit in the SDR is set to cause a link status sensor of the BMC device to monitor the status of the link indicator.

12. The apparatus of claim 8, wherein reporting the status of the link indicator is via a management system software.

13. The apparatus of claim 8, wherein reporting the status of the link indicator is via a management controller web-based user interface (Web UI).

14. The apparatus of claim 8, wherein the link indicator is a link light-emitting-diode (LED) on the NIC.

15. A non-transitory computer-readable medium storing executable instructions which cause a data processing device to:

monitor input signals at an input pin of a BMC device directly coupled to a link indicator of a network interface controller (NIC);

determine a connection status of the NIC based on the input signals and a sensor data record (SDR) for the link indicator; and report the status of the link indicator, over a network, to a management system.

16. The non-transitory computer-readable medium of claim 15, wherein an attribute of the input pin of the BMC device is configured as a general-purpose input (GPI).

17. The non-transitory computer-readable medium of claim 15, wherein the SDR is a local area network (LAN) type for the status of the link indicator.

18. The non-transitory computer-readable medium of claim 17, wherein the computer-readable medium further causes the data processing device to set a scanning bit in the SDR to cause a link status sensor of the BMC device to monitor the status of the link indicator.

19. The non-transitory computer-readable medium of claim 15, wherein reporting the status of the link indicator is via a management system software.

20. The non-transitory computer-readable medium of claim 15, wherein reporting the status of the link indicator is via a management controller web-based user interface (Web UI).

* * * * *